US006925381B2

(12) United States Patent
Adamczyk

(10) Patent No.: US 6,925,381 B2
(45) Date of Patent: Aug. 2, 2005

(54) METHODS, SYSTEMS AND COMPUTER PROGRAM PRODUCTS FOR RIDE MATCHING BASED ON CURRENT LOCATION INFORMATION

(75) Inventor: Maria Adamczyk, Alpharetta, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 0 days.

(21) Appl. No.: 10/602,150

(22) Filed: Jun. 24, 2003

(65) Prior Publication Data

US 2004/0267449 A1 Dec. 30, 2004

(51) Int. Cl.[7] ............................................. G01C 21/26
(52) U.S. Cl. ...................................... 701/210; 701/200
(58) Field of Search ................................ 701/210, 213, 701/201, 117; 705/5–14

(56) References Cited

U.S. PATENT DOCUMENTS 4,445,118 A     4/1984   Taylor et al. ............... 343/357
5,418,538 A     5/1995   Lau ............................. 342/357
5,663,735 A     9/1997   Eshenbach ................... 342/357
6,584,401 B2 *  6/2003   Kirshenbaum et al. ..... 701/202
2001/0056363 A1 12/2001  Gantz et al. .................... 705/9
2004/0049424 A1 * 3/2004  Murray et al. ................ 705/14

OTHER PUBLICATIONS

Cellocate Beacon™ Network, Cell–Loc Inc., V.1.6, Feb. 2002.

Moeglin, M. Krasner, K.; An Introduction to Snap Track™ Server–Aided GPS Technology; prior to May, 2003.

* cited by examiner

*Primary Examiner*—Yonel Beaulieu
(74) *Attorney, Agent, or Firm*—Myers Bigel Sibley & Sajovec

(57) ABSTRACT

Systems, methods and computer program products match a passenger with a driver for a trip to a destination. Candidate driver(s) for the trip are automatically identified based on a current location for the candidate driver(s) responsive to a request from the passenger. The passenger is provided an identification of the identified candidate driver.

51 Claims, 6 Drawing Sheets

METHODS, SYSTEMS AND COMPUTER PROGRAM PRODUCTS FOR RIDE MATCHING BASED ON CURRENT LOCATION INFORMATION

BACKGROUND OF THE INVENTION

The present invention relates to the field of data communications in general and more particularly, to ride matching systems.

Wireless communication systems (networks) are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

As the wireless communication industry continues to advance, other technologies are being integrated within these communication systems in order to provide value-added services. Recent governmental mandates, e.g., the response time requirements of the FCC Phase II E-911 service, make it imperative that the position of a mobile handset be determined accurately and in an expedited manner. One technology being considered to facilitate location determination is the global positioning system (GPS). Briefly, as illustrated in FIG. 1, GPS is a space-based triangulation system using satellites 52 and computers 58 to measure positions anywhere on the earth. GPS was first developed by the United States Department of Defense as a navigational system. The advantages of this navigational system over other land-based systems are that it is not limited in its coverage, it provides continuous 24-hour coverage, regardless of weather conditions, and is highly accurate. While the GPS technology that provides the greatest level of accuracy has been retained by the government for military use, a less accurate service has been made available for civilian use. In operation, a constellation of 24 satellites 52 orbiting the earth continually emit a GPS radio signal 54. A GPS receiver 56, e.g., a hand-held radio receiver with a GPS processor, receives the radio signals from the closest satellites and measures the time that the radio signal takes to travel from the GPS satellites to the GPS receiver antenna. By multiplying the travel time by the speed of light, the GPS receiver can calculate a range for each satellite in view. Ephemeris information provided in the satellite radio signal typically describes the satellite's orbit and velocity, thereby generally enabling the GPS processor to calculate the position of the GPS receiver 56 through a process of triangulation.

A variety of mobile terminal (MT) location techniques have been proposed. These location techniques include those based solely on the wireless network signals, Global Positioning System (GPS) based approaches and assisted GPS approaches combining communication signals and GPS signals.

Taylor et al., U.S. Pat. No. 4,445,118, discusses the concept of aiding or assisting GPS receivers. The assistance information allows the position computation function (PCF) to be done in the user receiver. Lau, U.S. Pat. No. 5,418,538, describes a system and method for aiding a remote GPS/GLONASS receiver by broadcasting "differential" information from a like receiver in a "reference station." Eshenbach, U.S. Pat. No. 5,663,735, describes a method whereby a GPS receiver derives an accurate absolute time reference from a radio signal. The GPS receiver performs the position calculation, and therefore must have the absolute time as well as the ephemeris and clock corrections for the GPS satellites. Another assisted-GPS standard for GSM-based networks is described in specification numbers 3GPP TS 04.31 and 3GPP TS 03.71. This standard is based on placing reference GPS receivers at various nodes in the network, capturing the ephemeris information from these receivers, then providing this information along with a list of visible satellites to all handset-based GPS receivers via messages on GSM downlink bearers. The benefit of this approach is that it allows the handset-based GPS receiver to be fully functional, i.e., it contains the PCF and also can operate in continuous navigation mode.

Another approach to a reduced complexity GPS location service to satisfy governmental mandates for FCC Phase II E-911 service provides only a simplified, GPS receiver in the MT, rather than a full function autonomous GPS receiver. An assisted location service associated with the communication network then is used to calculate the position of the MT. Such an approach is specified in the TIA/EIA/IS-801-1 specification (IS-801), which is implemented in the GPSOne protocol assisted location service available from SnapTrack Inc, a Qualcomm Company, as described at the website http://www.snaptrack.com. A GPSOne compatible receiver (i.e. located in the mobile terminal) generally performs all GPS satellite acquisition functions and then sends measurements to a centralized location server of a CDMA network serving the mobile terminal. By generating only intermediate navigation data at the GPSOne compatible receiver, some of the burden of performing positioning calculations may be shifter to the location server.

SUMMARY OF THE INVENTION

Embodiments of the present invention match a passenger with a driver for a trip to a destination. Candidate driver(s) for the trip are automatically identified based on a current location for the candidate driver(s) responsive to a request from the passenger. The passenger is provided an identification of the identified candidate driver.

In other embodiments of the present invention, identifying a candidate driver includes receiving a request that specifies the destination. A start location of the passenger is determined, as are current locations of a plurality of drivers. At least one of the plurality of drivers is identified as a candidate driver based on the determined start location of the passenger and the current locations of the plurality of drivers. A communication connection is established between the passenger and a candidate driver.

In further embodiments of the present invention, the plurality of drivers are registered and determining a current location of a plurality of drivers includes obtaining a last known location of the plurality of drivers from a location service. Registration requests from the plurality of drivers may identify the drivers and specify an availability as a driver. Obtaining a last known location of the plurality of drivers may include obtaining a last known location for selected ones of the plurality of drivers based on the request and/or the specified availability of the plurality of drivers. The location service may determine the last known location for the plurality of drivers based on satellite positioning system information received from the plurality of drivers. The satellite positioning system information may be Global Positioning System (GPS) information received from GPS receivers associated with the plurality of drivers. The GPS information may be transmitted to the location service over a wireless connection.

In other embodiments of the present invention, obtaining a last known location from a location service includes transmitting a request for the last known location to a location server associated with the location service over a communication network and receiving the last known location from the location server over the communication network. The location server may be configured to track the last known location of a plurality of wireless terminals configured to receive GPS information and ones of the drivers are associated with respective ones of the wireless terminals.

In further embodiments of the present invention a matching service registration request is received from the passenger that specifies the start location and the start location of the passenger is determined by retrieving the start location from the matching service registration request. The matching service registration request may specify a destination associated with the user and a time for the trip and receiving a request specifying the destination includes initiating the request based on the time for the trip.

In other embodiments of the present invention, establishing a communication connection includes establishing a voice connection and/or a text messaging connection between the passenger and a candidate driver to negotiate a payment for the trip. The payment may be transferred from an account of the passenger to an account of a candidate driver servicing the trip.

In further embodiments of the present invention, the received registration requests from the plurality of drivers specify an associated destination and/or availability data for the plurality of drivers and identifying at least one of the drivers as a candidate driver includes identifying at least one of the drivers as a candidate driver based on the associated destination and/or availability data of the identified at least one of the drivers. Identifying at least one of the drivers may include identifying at least one of the drivers having a current location and associated destination corresponding to the start location and destination of the passenger and having availability data indicating current availability as a driver as a candidate driver.

In other embodiments of the present invention, identifying at least one of the drivers includes identifying a first candidate driver. An alternate candidate driver is identified if the first candidate driver is not accepted by the passenger. A plurality of candidate drivers may be identified and establishing a communication connection may include establishing a communication connection with a first one of the plurality of candidate drivers designated by the passenger and establishing a communication connection with another of the plurality of candidate drivers designated by the passenger if the first one of the plurality of candidate drivers is not accepted by the passenger.

In further embodiments of the present invention, current traffic information is obtained from a traffic database and at least one of the drivers as a candidate driver based on the obtained current traffic information. A distance to the destination may be determined and an arrival time at the destination may be estimated based on the determined distance and the current traffic information.

In other embodiments of the present invention, systems match a passenger with a driver for a trip to a destination. A ride matching server is configured to identify a candidate driver for the trip based on a current location for the candidate driver. A location information interface is configured to receive current location information associated with the candidate driver from a satellite positioning system. A communication network interface is configured to receive a request for a driver for a trip from the passenger and to provide the passenger an identification of the candidate driver. The ride matching server may include a database of subscribed users identified as passengers and/or drivers and the database may include availability information and/or associated destinations for drivers. The location information interface may be an internet protocol interface to a digital communication network and the communication network interface may include a wireless communication network interface configured to communicate with wireless terminals associated with subscribed users. The communication network interface may further include an internet protocol interface to a digital communication network and/or a public switched telephone network (PSTN) interface. The ride matching server in some embodiments is also configured to transfer a payment from a passenger account to a driver account based on a specified payment for a trip.

While described above primarily with reference to methods, systems and computer program products for matching a passenger with a driver for a trip to a destination are also provided.

DETAILED DESCRIPTION

Figure 1:
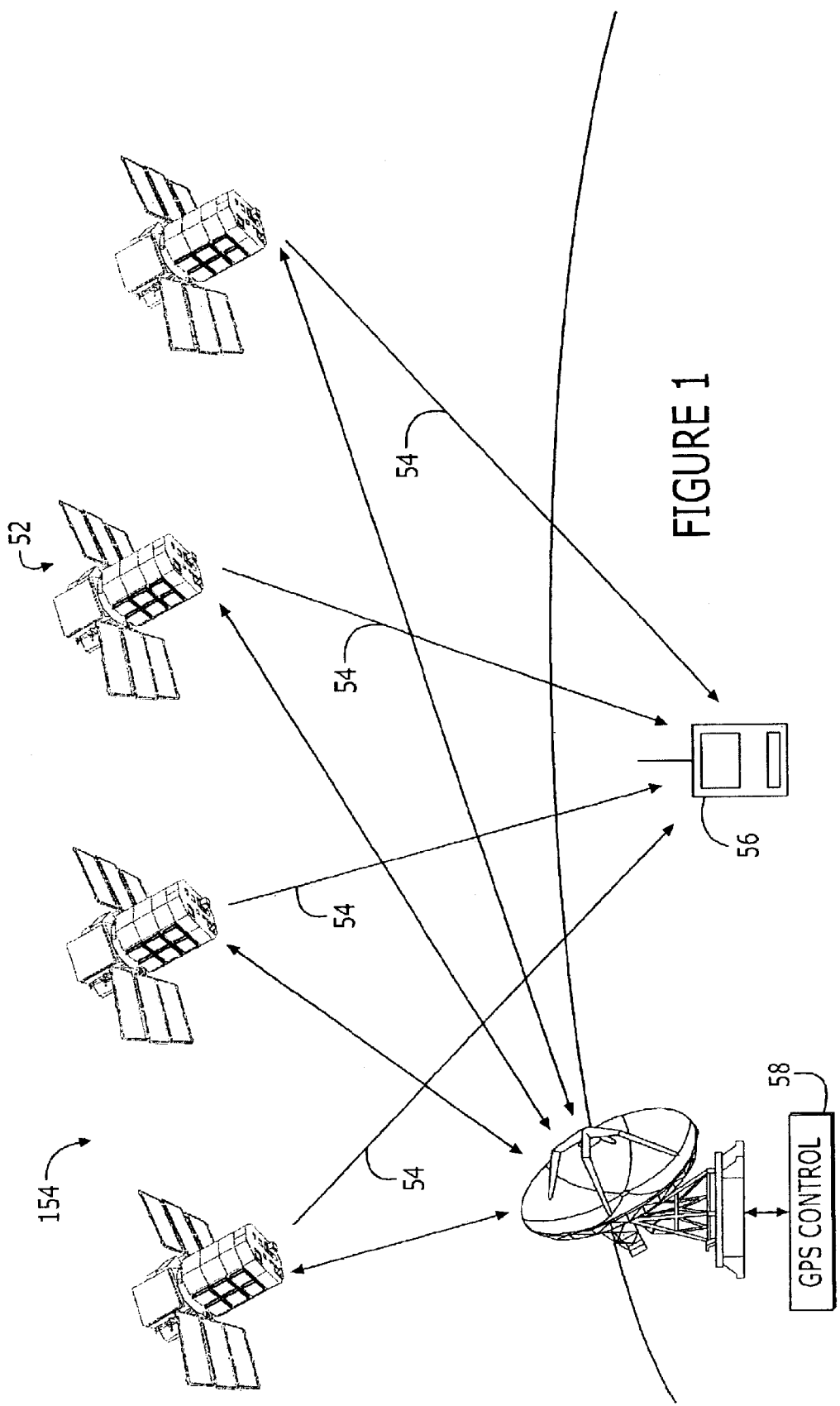
FIG. 1 is schematic block diagram illustrating a GPS system.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer usable storage medium having computer-usable program code means embodied in the medium. Any suitable computer readable medium may be used including hard disks, CD-ROMs, optical storage devices, a transmission media such as those supporting the Internet or an intranet, or magnetic storage devices.

Computer program code for carrying out operations of the present invention may be written in an object oriented programming language, such as Java® or C++. However, the computer program code for carrying out operations of the present invention may also be written in conventional procedural programming languages, such as the "C" programming language or assembly language. The program code may execute entirely on the user's computer, partly on the user's computer, as a stand alone software package, partly on the user's computer and partly on a remote computer, or entirely on the remote computer. In the latter scenario, the remote computer may be connected to the user's computer through a local area network (LAN) or a wide area network (WAN).

The present invention is described below with reference to flowchart illustrations and/or block diagrams of methods, apparatus (systems) and computer program products according to some embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the acts specified in the flowchart and/or block diagram block or blocks.

Figure 2:
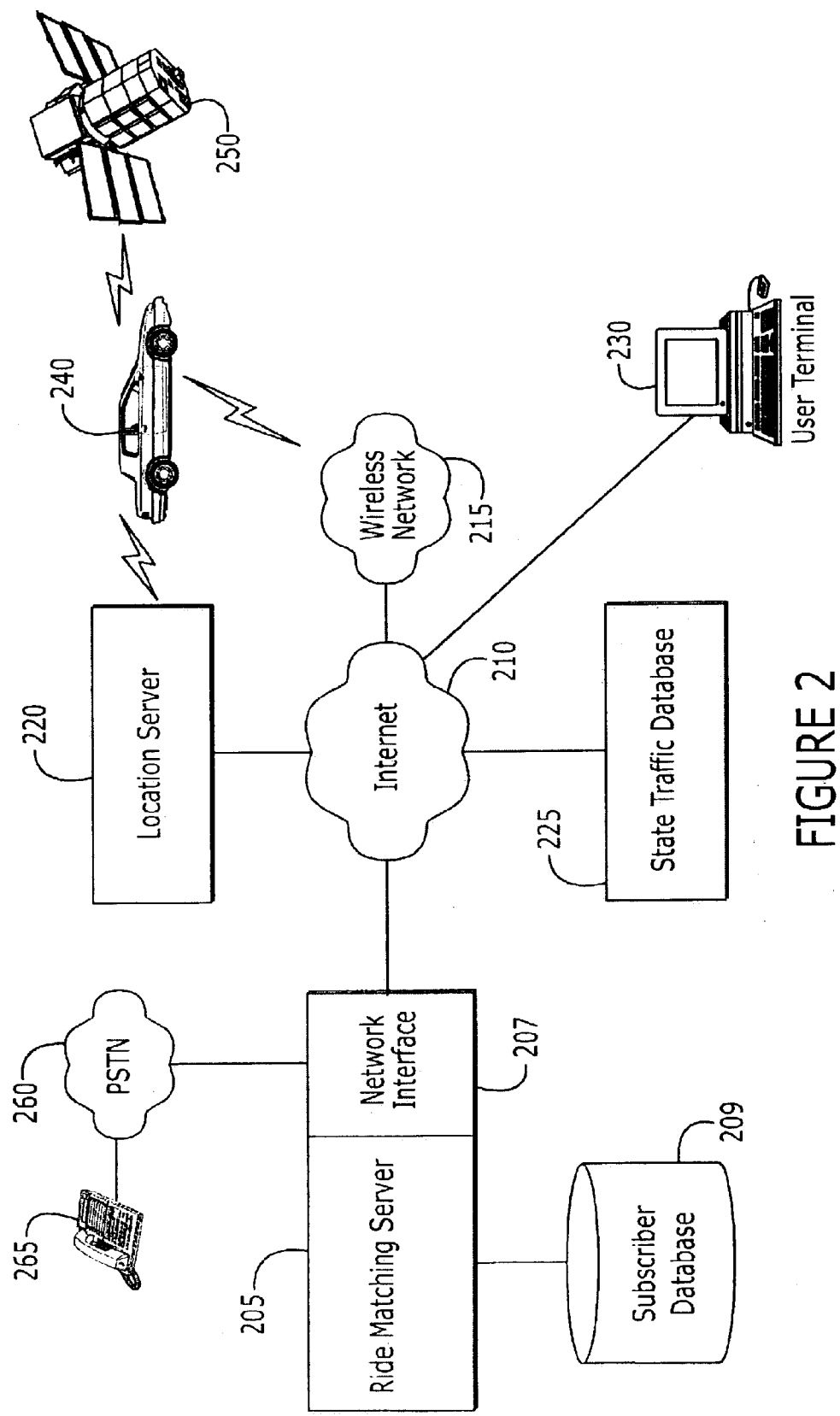
FIG. 2 is schematic block diagram illustrating a ride matching system according to some embodiments of the present invention.

Embodiments of the present invention will now be described with respect to the figures. Embodiments of the present invention provide methods, systems and/or computer program products for matching a passenger with a driver for a trip to a destination. Referring first to FIG. 2, a hardware and software environment including embodiments of the present invention will be described. As shown in FIG. 1, a ride matching server 205 is coupled through a network interface 207 to a network 210, such as an internet network. The ride matching server 205 is further operatively coupled to a subscriber data base 209. The ride matching server 205 is configured to identify a candidate driver for a trip requested by a passenger based on the current location of the candidate driver. The subscriber database 209 contains information related to subscribed users, who may be identified as passengers, drivers or both. The subscriber database 209 may contain additional information in various embodiments of the present invention, such as availability information for the designated drivers stating times and dates on which they are available for providing driver services responsive to passenger requests for a ride. Destinations may also be associated with passengers and/or drivers as well as start points for particular passengers and/or drivers. Thus, a ride matching server 205 may be configured to identify a candidate driver based on a variety of information including, but not limited to, the start location of a passenger, the current location of the driver, an associated destination of the passenger and/or driver and/or availability information for the driver.

The network interface 207, as shown in FIG. 2, couples to the internet 210 and the public switch telephone network (PSTN) 260. The network interface 207 further couples through the internet 210 to the wireless network 215 and other devices accessible over the internet 210. However, it is to be understood that the network interface 207 may, instead, directly couple to the wireless network 215 or to other of the server and terminal devices shown as accessed over the internet 210. Similarly, network interface 207 may connect to the PSTN 260 over the internet 210. As such, the network interface 207 provides a location information interface configured to receive current location information associated with a candidate driver from a satellite positioning system. In various embodiments of the present invention, such current location information is obtained from a location server 220. The location server 220 may obtain the satellite positioning based location information either directly from user location devices, such as car phone/mobile terminal 240 (hereinafter referred to as a mobile terminal) or through the wireless network 215 and the internet 210. The location information is acquired by the mobile terminal 240 based on measurements of signals from positioning system satellites, such as the GPS satellite 250.

The network interface 207 is further configured to receive a request for a driver for a trip from a passenger and to provide the passenger an identification of a candidate driver. The request for a driver may come from a variety of different sources, such as from the telephone 265, over the PSTN 260 or from the user terminal 230 over the internet 210. Similarly, a passenger may be provided an identification of a candidate driver by the network interface 207 over the PSTN 260, the internet 210 and/or the wireless network 215.

Also shown in FIG. 2 is a state traffic database 225 coupled to the internet 210. In various embodiments of the present invention, the network interface 207 may be operatively coupled to the state traffic database 225 so as to obtain current traffic information from the state traffic database 225.

As will be understood by those having skill in the art, a network 210 may include a plurality of separate linked physical communication networks, which, using a protocol, such as the Internet protocol (IP), may appear to be a single seamless communications network to user application programs. In addition, the network interface 207 may be a plurality of different interfaces coupled to different network types including wired and wireless networks. The location server 220 may be a variety of different location server types, such as an assisted location server associated with the wireless network 215 in connection, for example, with E911 service or other type of location server associated with the wireless network 215 that communicates with mobile terminals 240 directly or through the wireless network 215. Alternatively, the location server 220 may be integrated with the ride matching server 205 and maintained primarily to support the ride matching server 205 rather than being an integral part of an unrelated system, such as E911 location service. The user terminal 230 may be also be directly coupled to the ride matching server 205 rather than connected thereto over the internet 210. Similarly, the subscriber database 209 may be accessed by the ride matching server 205 over the internet 210 rather than being directly connected to the ride matching server 205.

Figure 3:
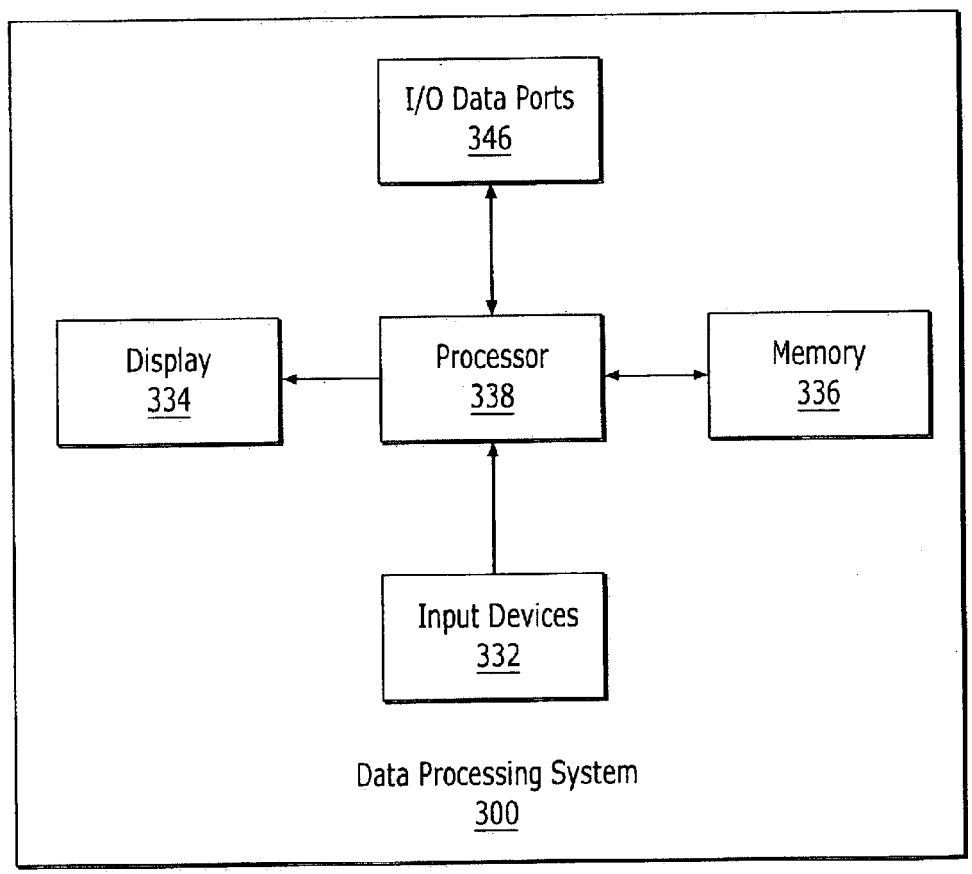
FIG. 3 is a block diagram of a data processing system implementing a ride matching server according to some embodiments of the present invention.

FIG. 3 illustrates an exemplary embodiment of a data processing system 300 suitable for use in accordance with embodiments of the present invention. The data processing system 300 typically includes input device(s) 332 such as a keyboard or keypad, a display 334, and a memory 336 that communicate with a processor 338. The data processing system 330 may further include an I/O data port(s) 346 that also communicate with the processor 338. The I/O data ports 346 can be used to transfer information between the data processing system 330 and another computer system or a network, such as the network 210 of FIG. 2. These components may be conventional components, such as those used in many conventional data processing systems, which may be configured to operate as described herein.

Figure 4:
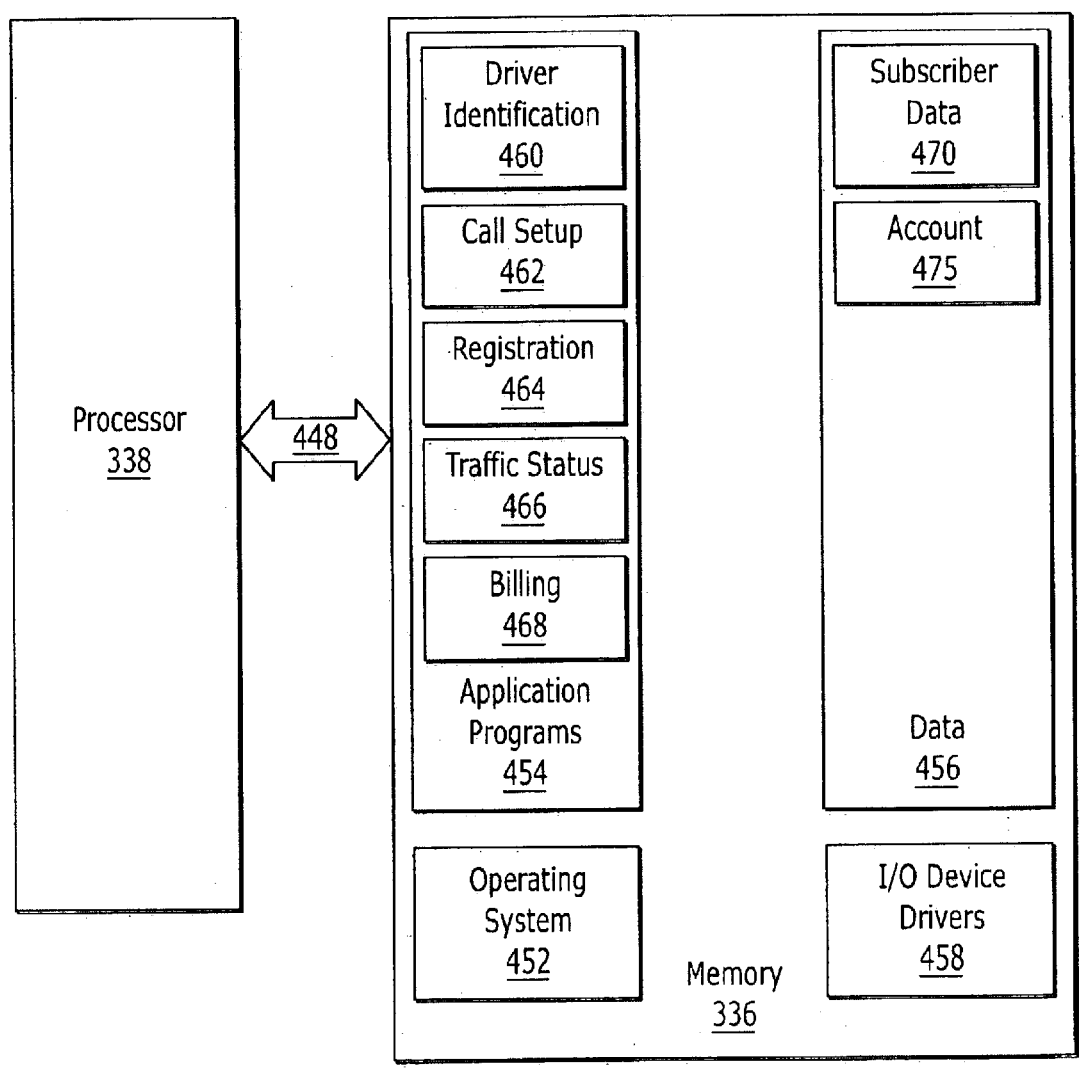
FIG. 4 is a more detailed block diagram of a data processing system implementing a ride matching server according to some embodiments of the present invention.

FIG. 4 is a block diagram of a data processing (computer) system that further illustrates systems, methods, and computer program products in accordance with embodiments of the present invention. The processor 338 communicates with the memory 336 via an address/data bus 448. The processor 338 can be any commercially available or custom microprocessor. The memory 336 is representative of the overall hierarchy of memory devices containing the software and data used to implement the functionality of the data processing system 300. The memory 336 can include, but is not limited to, the following types of devices: cache, ROM, PROM, EPROM, EEPROM, flash memory, SRAM, and DRAM.

As shown in FIG. 4, the memory 336 may include several categories of software and data used in the data processing system 300: the operating system 452; the application programs 454; the input/output (I/O) device drivers 458; and the data 456. As will be appreciated by those of skill in the art, the operating system 452 may be any operating system suitable for use with a data processing system, such as Solaris from Sun Microsystems, OS/2, AIX or System390 from International Business Machines Corporation, Armonk, N.Y., Windows95, Windows98, Windows NT, Windows ME, Windows XP or Windows 2000 from Microsoft Corporation, Redmond, Wash., Unix or Linux. The I/O device drivers 458 typically include software routines accessed through the operating system 452 by the application programs 454 to communicate with devices such as the I/O data port(s) 346 and certain memory 336 components. The application programs 454 are illustrative of the programs that implement the various features of the data processing system 300 and preferably include at least one application that supports operations according to embodiments of the present invention. Finally, the data 456 represents the static and dynamic data used by the application programs 454, the operating system 452, the I/O device drivers 458, and other software programs that may reside in the memory 336.

As is further seen in FIG. 4, the application programs 454 may include a driver identification module 460, a call setup module 462, a registration module 464, a traffic status module 466 and/or a billing module 468. The driver identification module 460 is configured to identify one or more drivers as candidate driver(s) based on, for example, a determined start location of a passenger and the current locations of the driver(s). The driver identification module 460 may further be configured to determine a start location of the passenger and the current locations of the plurality drivers. The call set up module 462, in various embodiments of the present invention, is configured to provide a passenger an identification of a candidate driver or drivers, for example, by establishing a communication connection between the passenger and the candidate driver.

The registration module 464 is configured to receive a request from a passenger for a driver for a trip. A request may specify the destination for the trip. Registration module 464 may be configured to receive such a request specific to a particular trip and/or as an initial registration procedure for subscribers as drivers and/or passengers in the subscriber database 209. Such initial registration information may include a selection of registration as a passenger and/or driver, a normal start point, a default destination point, an availability time for a driver and/or a normal associated destination for the driver.

In particular embodiments of the present invention, the traffic status module 466 is configured to obtain current traffic information from a traffic database that may be used by driver identification module 460 in identifying an appropriate candidate driver for a trip. Various embodiments of the present invention further include a billing module 468 that is configured transfer payment amounts from an account of a passenger to an account of the candidate driver for an agreed trip.

The data portion 456 of memory 336, as shown in the embodiments of FIG. 4, may include various types of data, such as the subscriber data 470 and the account data 475. The subscriber data 470, as discussed above, may include information received from the registration module 464. Similarly, the account data 475 may include separate accounts associated with each of the subscribers and may be used by the billing module 468 in arranging payment for different trips. Alternatively, where accounts for both the payee and the payor of a particular transaction are not available, the billing module 468 and the accounts data 475 may be used to generate the necessary billing information and credit any subsequent payments.

While the present invention is illustrated, for example, with reference to the driver identification module 460 being an application program in FIG. 4, as will be appreciated by those of skill in the art, other configurations may also be utilized while still benefiting from the teachings of the present invention. For example, the driver identification module 460 may also be incorporated into the operating system 452 or other such logical division of the data processing system 300. Thus, the present invention should not be construed as limited to the configuration of FIG. 4 but is intended to encompass any configuration capable of carrying out the operations described herein.

Furthermore, while each of the driver identification module 460, the call setup module 462, the registration module 464 and the traffic status module 460 are illustrated in a single data processing system, as will be appreciated by those of skill in the art, such functionality may be distributed across one or more data processing systems. For example, the functionality of the driver identification module 460 may be provided on one or more data processing (computer) systems that are separate from the data processing system that provides the functionality of the call setup module 462. Thus, the present invention should not be construed as limited to the configuration illustrated in FIGS. 3–4, and may be provided by other arrangements and/or division of function between data processing systems.

Figure 5:
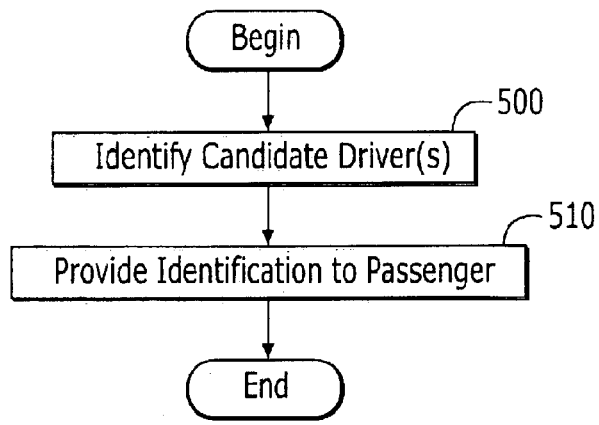
FIG. 5 is a flow chart illustrating operations for matching a passenger with a driver for a trip to a destination according to some embodiments of the present invention.

Referring now to the flowchart diagram of FIG. 5, operations for matching a passenger to a driver for a trip to a destination begin at Block 500 by identifying a candidate driver for the trip based on the current location of the candidate driver, responsive to a request from the passenger. For example, referring to FIG. 2, the request from the passenger may be received over the PSTN 260 from the telephone 265 or over the internet 210 from the user terminal 230. The request may be received at the same time as the driver is needed or may be included in an initial registration of the passenger as a subscriber, for example, by specifying the desire to have a driver to a particular location at a certain time on a particular day each week as part of the initial registration.

After identification of a candidate driver, the identification of the candidate driver is provided to the passenger (Block 510). The passenger may be provided the necessary identification, for example, by establishing a voice connection and/or setting up a text messaging connection between the passenger and the candidate driver so they may negotiate a payment or other agreement for the trip.

Figure 6:
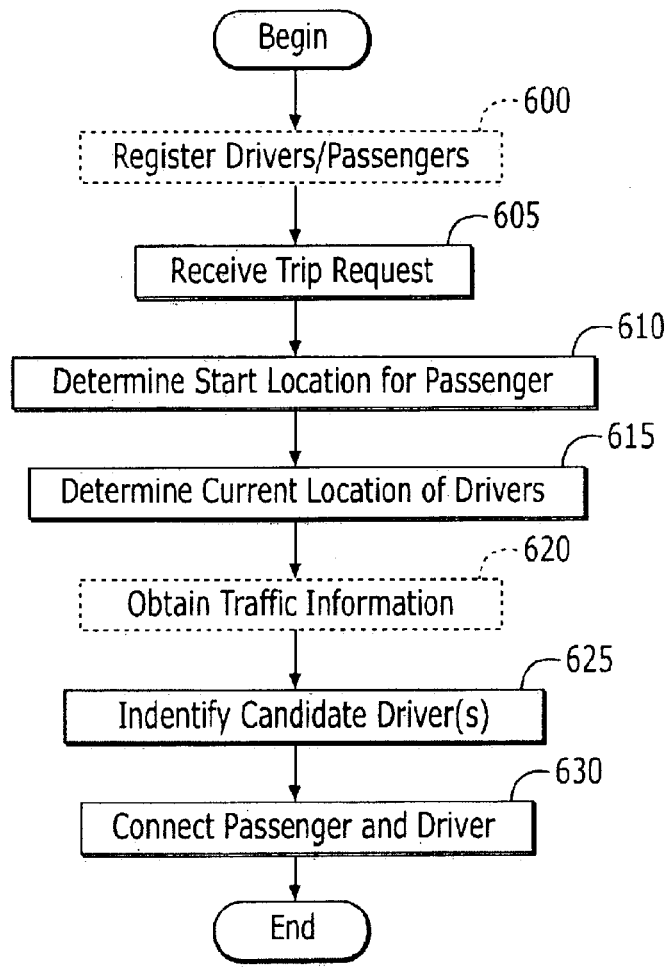
FIG. 6 is a flow chart illustrating operations for matching a passenger with a driver for a trip to a destination according to further embodiments of the present invention.

Further embodiments of the present invention are illustrated in the flow chart diagram of FIG. 6. As shown in FIG. 6, for some such embodiments, operations begin at Block 600 by registration of a variety of subscribers as drivers and/or passengers in the ride matching (carpooling) system. Where the specific trip information is not fully provided by the initial registration operations at Block 600, a matching service registration request is received from a passenger that specifies, for example, a start location and/or destination for the trip if such information is not otherwise available from the initial registration at Block 600 (Block 605). The matching service registration request may also specify a desired time for the trip if it is not a request for immediate identification of a candidate driver.

A start location is determined for the passenger (Block 610). As discussed above, the start location may be provided in the request received at Block 605 or may be retrieved from initial registration information provided at Block 600. Alternatively, the start location may be determined automatically and assumed to correspond with the source of the request. For example, with reference to FIG. 2 where a request is received from the telephone 265, caller identification and correlation of a phone number with an address may be used by the ride matching server 205 to determine the physical location of the telephone 265 and identify that location as the presumptive start point for the trip. Similarly, the request may be received from a mobile terminal 240 that is location enabled and the ride matching server 205 may query the location server 220 to obtain a current location for the mobile terminal 240. The current location for the requesting passenger's mobile terminal may then be presumed to be the start location for the trip request if no alternative start location is specified in the request.

The current location of one or more drivers available for consideration as a candidate driver is determined (Block 615). For example, a last known location of the driver(s) may be obtained from a location service, such as the location server 220 of FIG. 2. The location service may determine the last known location for the drivers based on information obtained by the mobile terminals 240 from the Global Positioning System Satellite 250. The GPS information may be transmitted to the location server 220 over the wireless network 215 and/or the internet 210 or received directly from the driver's mobile terminal 240. In particular embodiments of the present invention, operations at Block 615 include transmitting a request for the last known location to a location server 220 associated with the location service over the communication network, such as the internet 210, and receiving the last known location from the location server 220 over the communication network 210.

In some embodiments of the present invention, operations for matching a passenger with a driver at Block 620 include obtaining current traffic information, for example, from a state traffic database 225 (FIG. 2). Such information may be used in identifying candidate drivers at Block 625. At Block 625, one or more candidate drivers are identified based on respective start location, current location, destination and/or availability data obtained at one or more of Blocks 600, 605, 610, 615 and 620. For example, a driver having a current location and associated destination corresponding to the start location and destination of the passenger and having availability data indicating current availability as a driver may be identified as a candidate driver at Block 625.

More than one candidate driver may be identified at Block 625 and a best selection may be identified first to the passenger for consideration or all of the identified candidates may be provided for consideration to allow the passenger to make a determination as to which candidate driver to contact first to arrange the trip.

After a candidate driver is identified, a communication connection is established between the passenger and the candidate driver (Block 630). A connection may be provided that includes identification of the individual or may be initially established in a manner that protects privacy of the respective passenger and driver with subsequent personal information being provided only after an agreement is reached for the trip. The connection may be a voice connection, email and/or text messaging or other electronic communication media, which may allow the use of the ride matching server 205 to control privacy concerns of the individuals involved.

Figure 7:
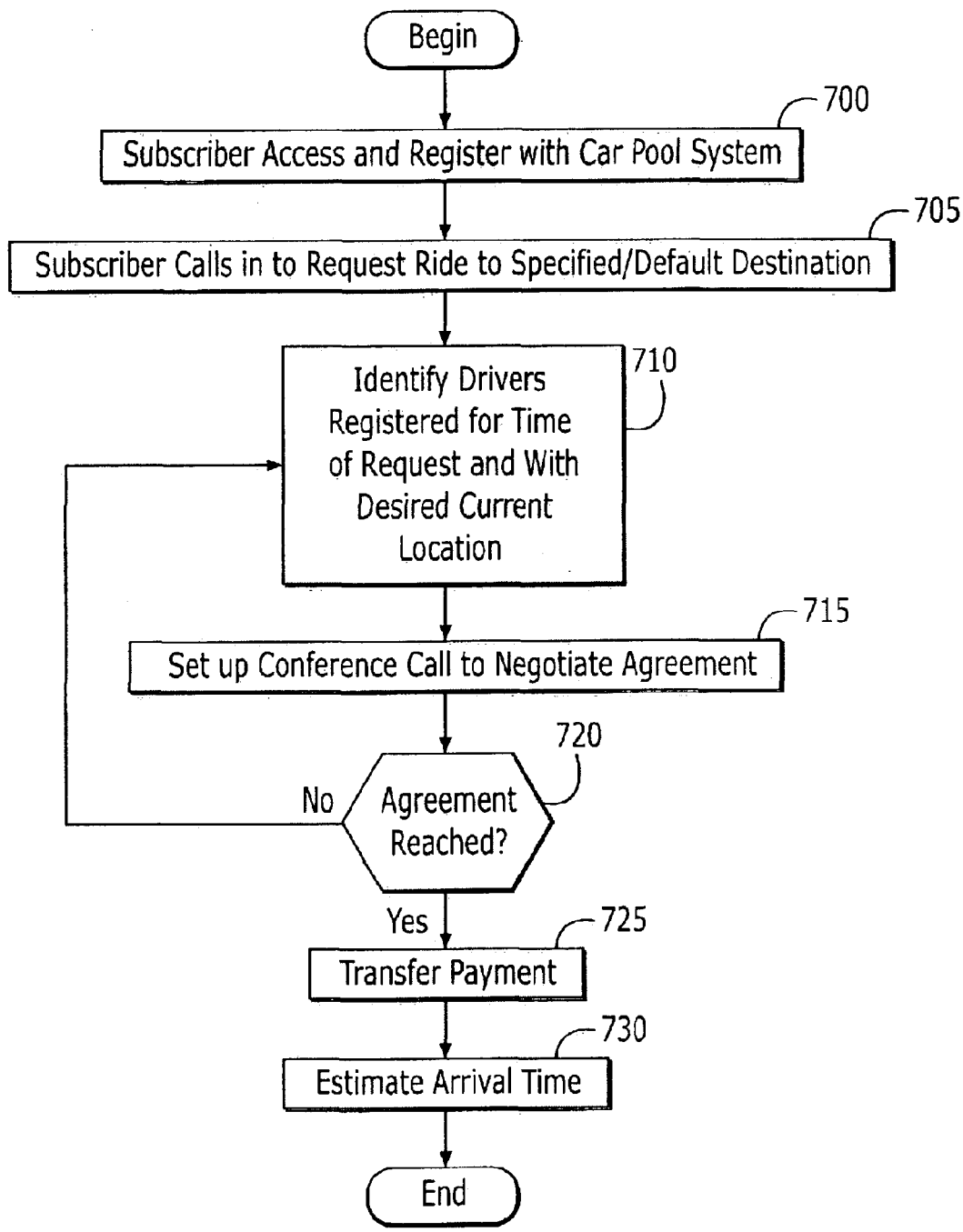
FIG. 7 is a flow chart illustrating operations for matching a passenger with a driver for a trip to a destination according to yet further embodiments of the present invention.

Further embodiments of the present invention are illustrated in the flow chart diagram of FIG. 7. As shown in FIG. 7, operations begin at Block 700 by having a subscriber access a ride matching service using the ride matching server 205 from a telephone or internet interface to register with the service. Such an initial registration may include providing information such as a home location, a work location, preferred routes for different trips, a wireless phone number, a wireline phone number and/or billing information. The subscriber can, at this time, register as a driver, a passenger, or both. Such registration information may be set up so that it can be updated and/or changed by a subscriber when their information or interest in the ride matching service changes. For a particular trip, the subscriber, in various embodiments of the present invention, calls into the ride matching service to request a ride and specifies a desired destination (or a default destination), such as a work location (Block 705). The request at Block 705 may specify a particular time in the future or may request an immediate identification of a candidate driver.

The ride matching service may then check for available and suitable drivers based on matching criteria, such as start and destination locations and preferred routing given the current location information for the candidate drivers (Block 710). Thus, matches for identifying a driver as a suitable candidate driver for a particular trip request may be found, for example, by correlating registered drivers for the day (i.e. subscribers who have specified availability as drivers for the day) with such drivers current locations and/or driving destinations. The location information used for identifying drivers at Block 710 may be retrieved from a location system, which may in turn use automated car phone and/or wireless terminal based tracking or location information.

If a match between a passenger and a candidate driver is found, the ride matching service establishes a connection, such as a conference call between the candidate driver and the requesting passenger (Block 715). If no agreement related to the trip is reached (Block 720), operations may return to Block 710 to identify additional drivers, either based on the same criteria or modified criteria intended to expand the pool of candidate drivers. If an agreement is reached between the candidate driver and the passenger (Block 720), the ride matching service may transfer payment from an account of the passenger to an account associated with the selected candidate driver (Block 725). In particular embodiments of the present invention, the ride matching service may further provide additional information to the passenger and/or driver, such as calculating the distance for the trip and estimating the arrival time at the destination (Block 730). The arrival time estimation may further consider accident and/or traffic congestion related information for the likely route of the trip based on data obtained from the state traffic database 225 of FIG. 2.

As described above, it will be understood that ride matching systems according to various embodiments of the present invention may increase the usability of carpooling arrangements by making such systems more convenient and efficient through automated identification of candidate drivers based on current location information. Such automated matching of candidate drivers may encourage use of the system by providing for matching of trips between drivers and passengers in a timely fashion. The service may be beneficially implemented in light of the increased usage of wireless devices that include GPS positioning receivers. Security concerns in various embodiments may be addressed by providing a subscriber access to the service with controlled access and verification of personal information stored in a secure database. In addition, such information may be repeatedly utilized so that, when a subscriber calls into the ride matching service, various of the personal information items would already be available for use in determining current availability of suitable drivers heading into the same area as the desired destination for the requesting passenger subscriber.

By automatically initiating a connection between the subscribing passenger and the candidate driver, such as by a telephone conference call, the automated system may further facilitate and reduce the burden of establishing a carpool connection between passengers and drivers. Furthermore, in various embodiments of the present invention, automatic billing arrangements are provided that may be based on actual cash transfers between subscribers or structured in a manner that allocates a fixed value amount to each registered subscriber, which they may then maintain by acting both as a driver and passenger. Thus, the automatic registration of cars (subscribers) and current locations linked with locations of requesting passengers, further facilitated by automated connection of passengers and candidate drivers to arrange details of a trip and, in some embodiments, even automated processing of the payment for the trip between accounts of a passenger and driver, may facilitate more effective utilization of such a ride matching service over current attempts at establishing more carpooling. Accordingly, beneficial improvements in traffic volumes and/or environmental impacts from heavy automotive traffic may be provided particularly in highly dense urban areas.

The flowcharts, flow diagrams and block diagrams of FIGS. 2 through 7 illustrate the architecture, functionality, and operation of possible implementations of systems, methods and computer program products for matching a passenger with a driver for a trip to a destination according to embodiments of the present invention. In this regard, each block in the flow charts or block diagrams may represent a module, segment, or portion of code, which comprises one or more executable instructions for implementing the specified logical act(s). It should also be noted that, in some alternative implementations, the acts noted in the blocks may occur out of the order noted in the figures. For example, two blocks shown in succession may, in fact, be executed substantially concurrently, or the blocks may sometimes be executed in the reverse order, depending upon the functionality involved.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method for matching a passenger with a driver for a trip to a destination, comprising:
   automatically identifying a candidate driver for the trip based on a current location for the candidate driver responsive to a request from the passenger; and
   providing the passenger an identification of the identified candidate driver, including establishing a voice connection and/or a text messaging connection between the passenger and the identified candidate driver to negotiate a payment for the trip.

2. The method of claim 1 wherein identifying a candidate driver comprises:
   receiving the request, wherein the request specifies the destination;
   determining a start location of the passenger;
   determining current locations of a plurality of drivers; and
   identifying at least one of the plurality of drivers as the candidate driver based on the determined start location of the passenger and the current locations of the plurality of drivers.

3. The method of claim 2 wherein the method further comprises registering the plurality of drivers and wherein determining a current location of a plurality of drivers comprises obtaining a last known location of the plurality of drivers from a location service.

4. The method of claim 3 wherein registering the plurality of drivers comprises receiving registration requests from the plurality of drivers that identify the drivers and specify an availability as a driver.

5. The method of claim 4 wherein obtaining a last known location of the plurality of drivers comprises obtaining a last known location for selected ones of the plurality of drivers based on the request and/or the specified availability of the plurality of drivers.

6. The method of claim 4 wherein the location service determines the last known location for the plurality of drivers based on satellite positioning system information received from the plurality of drivers.

7. The method of claim 6 wherein the satellite positioning system information comprises Global Positioning System (GPS) information received from GPS receivers associated with the plurality of drivers.

8. The method of claim 7 wherein the GPS information is transmitted to the location service over a wireless connection.

9. The method of claim 8 wherein obtaining a last known location from a location service comprises:
transmitting a request for the last known location to a location server associated with the location service over a communication network; and
receiving the last known location from the location server over the communication network.

10. The method of claim 9 wherein the location server is configured to track the last known location of a plurality of wireless terminals configured to receive GPS information and wherein ones of the drivers are associated with respective ones of the wireless terminals.

11. The method of claim 6 wherein the method further comprises receiving a matching service registration request from the passenger that specifies the start location and wherein determining the start location of the passenger comprises retrieving the start location from the matching service registration request.

12. The method of claim 11 wherein the matching service registration request specifies a destination associated with the user and a time for the trip and wherein receiving a request specifying the destination comprises initiating the request based on the time for the trip.

13. The method of claim 6 further comprising receiving a matching service registration request from the passenger that identifies the passenger and wherein receiving a request comprises receiving a request from the passenger that specifies the start location of the passenger for the request and wherein determining a start location of the passenger comprises retrieving the start location from the request.

14. The method of claim 6 further comprising transferring the payment from an account of the passenger to an account of a candidate driver servicing the trip.

15. The method of claim 6 wherein the received registration requests from the plurality of drivers specify an associated destination and/or availability data for the plurality of drivers and wherein identifying at least one of the drivers comprises identifying at least one of the drivers as a candidate driver based on the associated destination and/or availability data of the identified at least one of the drivers.

16. The method of claim 15 wherein identifying at least one of the drivers comprises identifying at least one of the drivers having a current location and associated destination corresponding to the start location and destination of the passenger and having availability data indicating current availability as a driver as a candidate driver.

17. The method of claim 16 wherein identifying at least one of the drivers comprises:
identifying a first candidate driver; and
identifying an alternate candidate driver if the first candidate driver is not accepted by the passenger.

18. The method of claim 17 wherein identifying at least one of the drivers comprises identifying a plurality of candidate drivers and wherein establishing a communication connection comprises establishing a communication connection with a first one of the plurality of candidate drivers designated by the passenger and establishing a communication connection with another of the plurality of candidate drivers designated by the passenger if the first one of the plurality of candidate drivers is not accepted by the passenger.

19. The method of claim 17 further comprising registering a subscriber as both a passenger and a driver.

20. The method of claim 15 further comprising obtaining current traffic information from a traffic database and wherein identifying at least one of the drivers comprises identifying at least one of the drivers based on the obtained current traffic information.

21. The method of claim 20 further comprising determining a distance to the destination and estimating an arrival time at the destination based on the determined distance and the current traffic information.

22. The method of claim 2 wherein the method further comprises receiving registration requests from the plurality of drivers that identify the drivers and specify an availability as a driver and wherein determining a current location of a plurality of drivers comprises requesting location information from selected ones of the plurality of drivers based on the specified availability, the start location and/or the destination location.

23. The method of claim 22 wherein requesting location information comprises requesting satellite positioning system information from the selected ones of the plurality of drivers.

24. The method of claim 2 wherein the method further comprises receiving a matching service registration request from the passenger that specifies the start location and wherein determining the start location of the passenger comprises retrieving the start location from the matching service registration request.

25. The method of claim 2 further comprising receiving a matching service registration request from the passenger that identifies the passenger and wherein receiving a request comprises receiving a request from the passenger that specifies the start location of the passenger for the request and wherein determining a start location of the passenger comprises retrieving the start location from the request.

26. The method of claim 2 further comprising transferring the payment from an account of the passenger to an account of the candidate driver.

27. The method of claim 2 wherein the received registration requests from the plurality of drivers specify an associated destination and/or availability data for the plurality of drivers and wherein identifying at least one of the drivers comprises identifying at least one of the drivers as a candidate driver based on the associated destination and/or availability data of the identified at least one of the drivers.

28. The method of claim 27 wherein identifying at least one of the drivers comprises identifying at least one of the drivers having a current location and associated destination corresponding to the start location and destination of the passenger and having availability data indicating current availability as a driver as a candidate driver.

29. The method of claim 2 wherein identifying at least one of the drivers comprises:
identifying a first candidate driver; and
identifying an alternate candidate driver if the first candidate driver is not accepted by the passenger.

30. The method of claim 2 wherein identifying at least one of the drivers comprises identifying a plurality of candidate drivers and wherein establishing a communication connection comprises establishing a communication connection with a first one of the plurality of candidate drivers designated by the passenger and establishing a communication connection with another of the plurality of candidate drivers designated by the passenger if the first one of the plurality of candidate drivers is not accepted by the passenger.

31. The method of claim 2 further comprising obtaining current traffic information from a traffic database and wherein identifying at least one of the drivers comprises identifying at least one of the drivers based on the obtained current traffic information.

32. A system for matching a passenger with a driver for a trip to a destination, comprising:
   a ride matching server configured to identify a candidate driver for the trip based on a current location for the candidate driver and configured to transfer a payment from a passenger account to a driver account based on a specified payment for a trip;
   a location information interface configured to receive current location information associated with the candidate driver; and
   a communication network interface configured to receive a request for a driver for a trip from the passenger and to provide the passenger an identification of the candidate driver.

33. The system of claim 32 wherein the ride matching server is further configured to identify a candidate driver based on a start location of the passenger.

34. The system of claim 33 wherein the ride matching server is further configured to identify a candidate driver based on an associated destination of the driver and/or availability information for the driver.

35. The system of claim 34 wherein the ride matching server further comprises a database of subscribed users identified as passengers and/or drivers and wherein the database includes availability information and/or associated destinations for drivers.

36. The system of claim 35 wherein the current location information comprises last known location information from a location server operatively coupled to the location information interface.

37. The system of claim 36 further comprising the location server.

38. The system of claim 35 wherein the location information interface comprises an internet protocol interface to a digital communication network.

39. The system of claim 35 wherein the communication network interface includes a wireless communication network interface configured to communicate with wireless terminals associated with subscribed users.

40. The system of claim 39 wherein the communication network interface further includes an internet protocol interface to a digital communication network and/or a public switched telephone network (PSTN) interface.

41. A system for matching a passenger with a driver for a trip to a destination, comprising:
   means for identifying a candidate driver for the trip based on a current location for the candidate driver responsive to a request from the passenger;
   means for providing the passenger an identification of the identified candidate driver; and
   means for transferring a payment from a passenger account to a driver account based on a specified payment for a trip.

42. The system of claim 41 wherein the means for identifying a candidate driver comprises:
   means for receiving the request, wherein the request specifies the destination;
   means for determining a start location of the passenger;
   means for determining current locations of a plurality of drivers;
   means for identifying at least one of the plurality of drivers as a candidate driver based on the determined start location of the user and the current locations of the plurality of drivers; and
   wherein the means for providing the passenger an identification comprises means for establishing a communication connection between the passenger and a candidate driver.

43. The system of claim 42 further comprising means for obtaining current traffic information from a traffic database and wherein the means for identifying at least one of the drivers comprises means for identifying at least one of the drivers based on the obtained current traffic information.

44. The system of claim 42 further comprising means for receiving registration requests from the plurality of drivers that identify the drivers and specify an availability as a driver and wherein the means for determining a current location of a plurality of drivers comprises means for requesting location information for selected ones of the plurality of drivers based on the specified availability, the start location and/or the destination location.

45. A computer program product for matching a passenger with a driver for a trip to a destination, the computer program product comprising:
   a computer-readable storage medium having computer-readable program code embodied in said medium, said computer-readable program code comprising:
   computer-readable program code that identifies a candidate driver for the trip based on a current location for the candidate driver responsive to a request from the passenger;
   computer-readable program code provides the passenger an identification of the identified candidate driver; and
   computer-readable program code that transfers a payment from a passenger account to a driver account based on a specified payment for a trip.

46. The computer program product of claim 45 wherein the computer-readable program code that identifies a candidate driver comprises:
   computer-readable program code that receives the request, wherein the request specifies the destination;
   computer-readable program code that determines a start location of the passenger;
   computer-readable program code that determines current locations of a plurality of drivers;
   computer-readable program code that identifies at least one of the plurality of drivers as a candidate driver based on the determined start location of the user and the current locations of the plurality of drivers; and
   wherein the computer-readable program code that provides the passenger an identification comprises computer-readable program code that establishes a communication connection between the passenger and a candidate driver.

47. The computer program product of claim 46 further comprising computer-readable program code that obtains current traffic information from a traffic database and wherein the computer-readable program code that identifies at least one of the drivers comprises computer-readable program code that identifies at least one of the drivers based on the obtained current traffic information.

48. The computer program product of claim 46 further comprising computer-readable program code that receives registration requests from the plurality of drivers that iden tify the drivers and specify an availability as a driver and wherein the computer-readable program code that determines a current location of a plurality of drivers comprises computer-readable program code that requests location information for selected ones of the plurality of drivers based on the specified availability, the start location and/or the destination location.

49. A method for matching a passenger with a driver for a trip to a destination, comprising:

automatically identifying a candidate driver for the trip based on a current location for the candidate driver responsive to a request from the passenger;

providing the passenger an identification of the identified candidate driver; and transferring a payment from a passenger account to a driver account based on a specified payment for a trip.

50. A data processing system configured to carry out the method of claim 1.

51. A computer program product comprising computer readable program code configured to carry out the method of claim 1.

* * * * *